United States Patent
Ushijima et al.

(10) Patent No.: US 12,511,635 B2
(45) Date of Patent: Dec. 30, 2025

(54) NON-TRANSITORY COMPUTER-READABLE RECORDING MEDIUM, NOTIFICATION METHOD, AND INFORMATION PROCESSING DEVICE

(71) Applicant: Fujitsu Limited, Kawasaki (JP)

(72) Inventors: Satoru Ushijima, Kawasaki (JP); Ryo Ishida, Kawasaki (JP); Yasuhiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 17/939,978

(22) Filed: Sep. 8, 2022

(65) Prior Publication Data
US 2023/0097352 A1    Mar. 30, 2023

(30) Foreign Application Priority Data
Sep. 30, 2021   (JP) ................. 2021-160827

(51) Int. Cl.
*G06Q 20/20* (2012.01)
*G06Q 20/18* (2012.01)
*G06T 7/70* (2017.01)

(52) U.S. Cl.
CPC .......... *G06Q 20/208* (2013.01); *G06Q 20/18* (2013.01); *G06T 7/70* (2017.01); *G06T 2207/30242* (2013.01)

(58) Field of Classification Search
CPC .... G06Q 20/208; G06Q 20/18; G06Q 20/203; G06T 7/70; G06T 2207/30242;
(Continued)

(56) References Cited

U.S. PATENT DOCUMENTS

2008/0027817 A1*  1/2008  Iizaka ............... G06Q 20/201
                                                        235/462.15
2018/0096567 A1*  4/2018  Farrow .............. G06V 40/161
(Continued)

FOREIGN PATENT DOCUMENTS

JP    2011054038 A    3/2011
JP    2011141644 A    7/2011
(Continued)

OTHER PUBLICATIONS

EESR dated Feb. 21, 2023 for the corresponding European patent application No. 22193145.4, 8pp.
(Continued)

*Primary Examiner* — Fahd A Obeid
*Assistant Examiner* — Jessica E Sullivan
(74) *Attorney, Agent, or Firm* — XSENSUS LLP

(57) ABSTRACT

An information processing device acquires, from an accounting machine, product information generated when the accounting machine reads a code on a product identifies a first feature amount related to first number of times indicating number of products purchased, based on the acquired product information acquires an image obtained by capturing an image of an object disposed in a certain area adjacent to the accounting machine and containing the product identifies a second feature amount related to second number of times indicating number of times of taking out operations of a product placed in the object and notifies with an alert based on the first feature amount and the second feature amount.

12 Claims, 13 Drawing Sheets

(58) Field of Classification Search
CPC ...... G07G 1/0009; G07G 1/0063; G07G 1/12; G07G 3/003; G07G 1/0036; G07G 1/0081; G06V 10/14; G06V 20/52; G06V 40/28

See application file for complete search history.

(56) References Cited

U.S. PATENT DOCUMENTS

| | | | |
|---|---|---|---|
| 2018/0276480 A1* | 9/2018 | Peterson | G06V 40/103 |
| 2020/0019921 A1 | 1/2020 | Buibas et al. | |
| 2020/0020112 A1* | 1/2020 | Buibas | G01G 19/4144 |
| 2020/0020113 A1 | 1/2020 | Buibas et al. | |
| 2020/0027218 A1 | 1/2020 | Buibas et al. | |
| 2021/0280027 A1 | 9/2021 | Wen et al. | |
| 2021/0295057 A1* | 9/2021 | Kundu | G06T 7/00 |
| 2021/0334574 A1* | 10/2021 | Zhang | G06T 7/13 |

FOREIGN PATENT DOCUMENTS

| | | | |
|---|---|---|---|
| JP | 5054670 B2 | 10/2012 | |
| JP | 2016057813 A | 4/2016 | |
| JP | 2020-53019 A | 4/2020 | |

OTHER PUBLICATIONS

Korean Office Action issued Jul. 30, 2024, in corresponding Korean Patent Application No. 10-2022-0119192, 9pp.
JP-OA mailed on Feb. 25, 2025 for corresponding Japanese Application No. 2021-160827, 8pp.
KR-OA mailed on Mar. 19, 2025 for corresponding Korean Application No. 10-2022-0119192, 9pp.
European Office Action issued Sep. 3, 2025 in corresponding European Patent Application No. 22193145.4, 7 pages.

\* cited by examiner

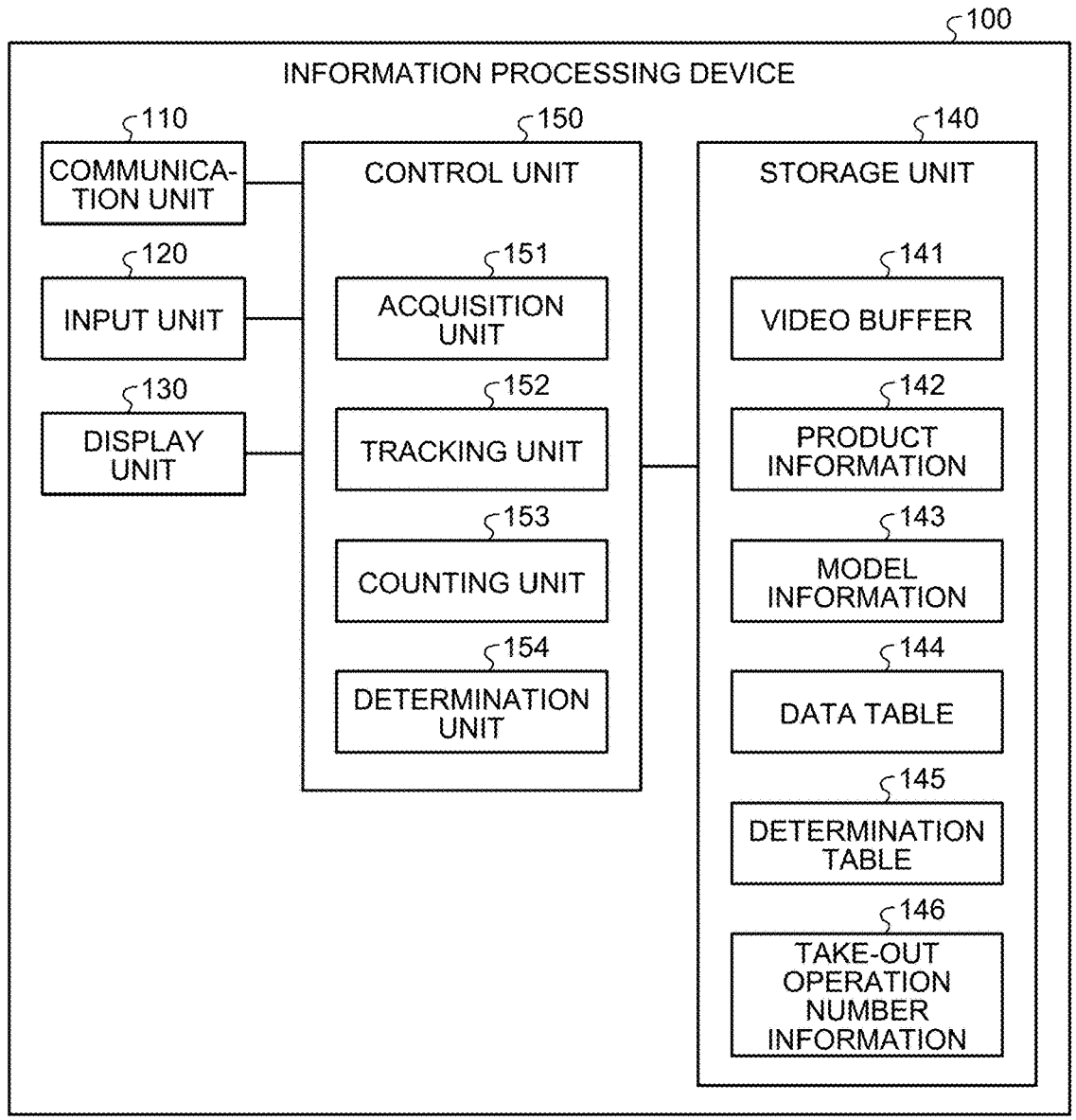

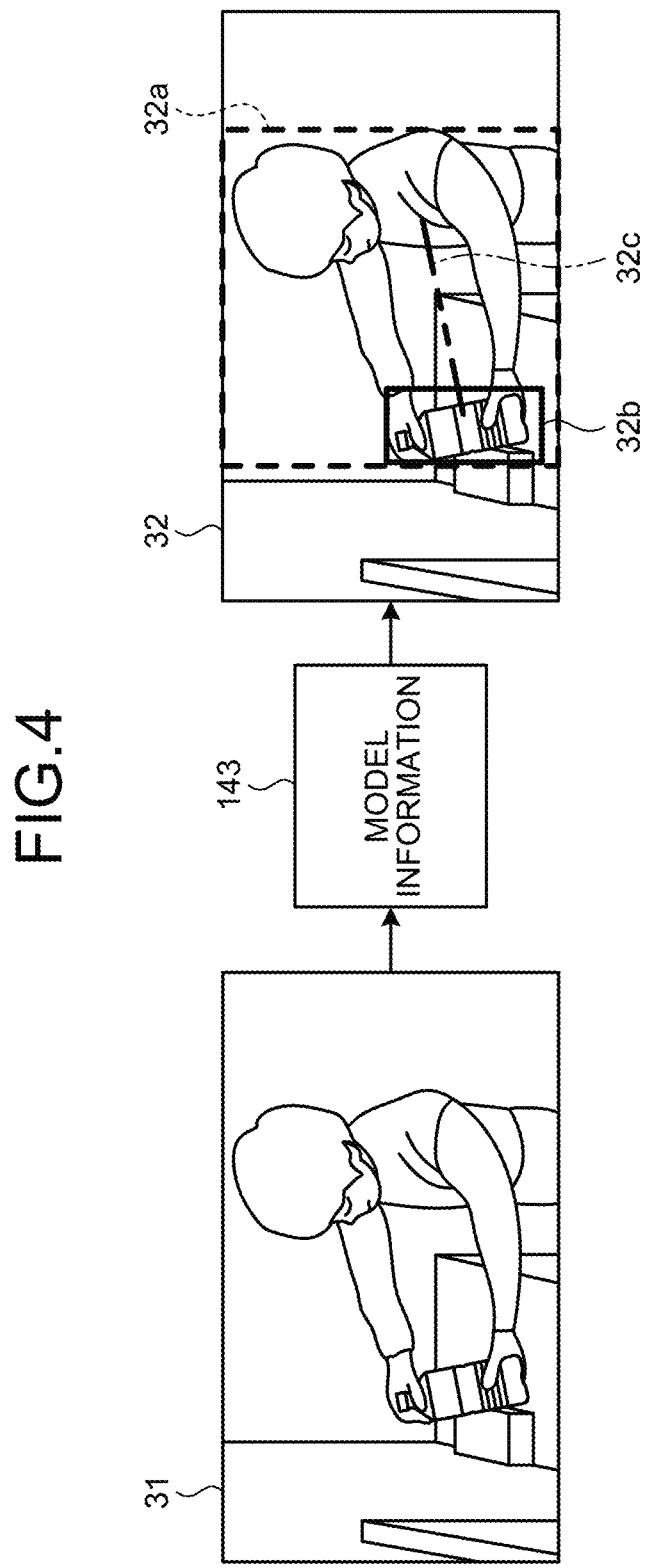

FIG.5

DETECTION RESULT TABLE ⌐144a

| PRODUCT AREA COORDINATES |
|---|
| [100, 100, 110, 110] |
| [500, 500, 510, 510] |

TRACKING OBJECT TABLE ⌐144b

| ID | PRODUCT AREA COORDINATES | LOST COUNT | STAY COUNT |
|---|---|---|---|
| 1 | [110, 110, 120, 120] | 0 | 5 |
| 3 | [190, 190, 200, 200] | 2 | 1 |

TRACKING-BEING-STOPPED OBJECT TABLE ⌐144c

| ID | PRODUCT AREA COORDINATES | FLAG |
|---|---|---|
| 2 | [410, 410, 420, 420] | false |

| ID | PREVIOUS FRAME POSITION | COUNTED FLAG |
|---|---|---|
| 1 | IN | false |
| 3 | IN | false |

NON-TRANSITORY COMPUTER-READABLE RECORDING MEDIUM, NOTIFICATION METHOD, AND INFORMATION PROCESSING DEVICE

CROSS-REFERENCE TO RELATED APPLICATION (S)

This application is based upon and claims the benefit of priority of the prior Japanese Patent Application No. 2021-160827, filed on Sep. 30, 2021, the entire contents of which are incorporated herein by reference.

FIELD

The embodiment discussed herein is related to a notification program and the like.

BACKGROUND

Self-checkout machines have become popular at stores such as supermarkets and convenience stores. A self-checkout machine is a Point-Of-Sale (POS) checkout system that allows a user who is purchasing a product to perform a series of operations from reading barcodes on products to settling the payment. For example, by implementing self-checkout machines, it is possible to reduce labor costs and prevent mistakes made by store clerks at checkout.

On the other hand, the self-checkout machines are expected to detect misbehavior by users such as not performing barcode reading. For example, to solve this problem, there are conventional techniques that analyze image data of a camera, that tracks a person in the store, and that specifies the timing at which the person being tracked picks up or moves a product. By using a conventional technique such as above, it is possible to automatically determine whether a user has performed a barcode reading operation.

FIG. 17 is a diagram for explaining a conventional technique. In the example illustrated in FIG. 17, when image data 10 is input, an area 10a of a self-checkout machine is detected, and a scan area 10b of the self-checkout machine is detected. In the conventional techniques, when an area 10c of a product held by a user is detected, and when the area 10c of the detected product enters the scan area 10b, it is determined that the user has performed a barcode reading operation. The related technologies are described, for example, in Japanese Laid-open Patent Publication No. 2020-53019.

SUMMARY

According to an aspect of an embodiment, a non-transitory computer-readable recording medium has stored therein a notification program that causes a computer to execute processing that includes acquiring, from an accounting machine, product information generated when the accounting machine reads a code on a product; identifying a first feature amount related to first number of times indicating number of products purchased, based on the acquired product information; acquiring an image obtained by capturing an image of an object disposed in a certain area adjacent to the accounting machine and containing the product; identifying a second feature amount related to second number of times indicating number of times of taking out operations of a product placed in the object; and notifying with an alert based on the first feature amount and the second feature amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a functional block diagram illustrating a configuration of an information processing device according to the present embodiment;

FIG. 3 is a diagram illustrating an example of a data structure of product information;

FIG. 4 is a diagram for explaining model information;

FIG. 5 is a diagram illustrating an example of a data structure of a data table;

FIG. 6 is a diagram illustrating an example of a data structure of a determination table;

DESCRIPTION OF EMBODIMENT

However, in the conventional technique described above, it is not possible to detect unpaid items.

Figure 17:
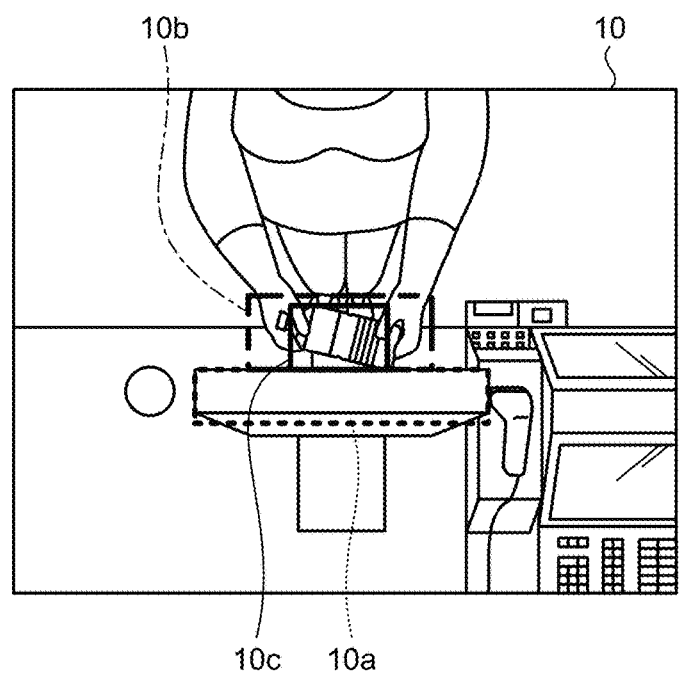
FIG. 17 is a diagram for explaining a conventional technique.

In FIG. 17, some users move a product to be purchased to the scan area 10b of the self-checkout machine but do not notice a failure in barcode reading, and some users pretend to perform barcode reading in the scan area 10b. For example, if a user moves the barcode to the scan area 10b and pretends to perform barcode reading, the conventional technique determines that the user has performed a barcode reading operation.

Preferred embodiments of the present invention will be explained with reference to accompanying drawings. However, the invention is not limited to the embodiment.

Figure 1:
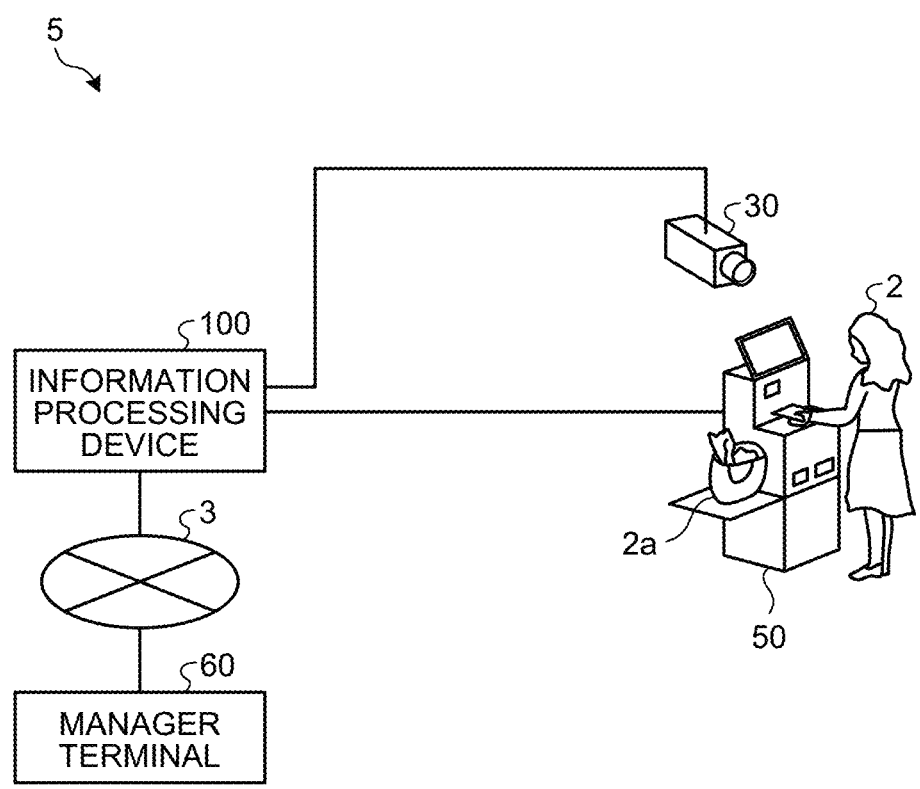
FIG. 1 is a diagram illustrating an example of a system according to the present embodiment.

FIG. 1 is a diagram illustrating an example of a system according to the present embodiment. As illustrated in FIG. 1, a system 5 includes a camera 30, a self-checkout machine 50, a manager terminal 60, and an information processing device 100.

The information processing device 100 is connected to the camera 30 and the self-checkout machine 50. The information processing device 100 is connected to the manager terminal 60 via a network 3. The camera 30 and the self-checkout machine 50 may also be connected to the information processing device 100 via the network 3.

The camera 30 is a camera for capturing video of an area including the self-checkout machine 50 and a basket 2a. The camera 30 transmits video data to the information processing device 100. In the following description, the data of video will be referred to as "video data".

The video data includes a plurality of image frames in chronological order. A frame number is assigned to each of the image frames in ascending chronological order. One image frame is a still image captured by the camera 30 at a certain timing.

The self-checkout machine 50 is a POS register system that allows a user 2 who is purchasing a product to perform a series of operations from reading the barcode on the product to settling the payment. For example, when the user 2 takes out a product to be purchased from the basket 2a and moves the product to the scan area of the self-checkout machine 50, the self-checkout machine 50 scans the barcode on the product.

The user 2 repeatedly executes the operation described above, and upon completing the scanning of products, the user 2 operates the touch panel on the self-checkout machine 50 and the like, and submits a settlement request. Upon receiving the settlement request, the self-checkout machine 50 presents the number of products to be purchased, the amount of purchase, and the like, and executes the settlement process. The self-checkout machine 50 stores the information on the scanned products, from when the user 2 starts scanning to when the user 2 submits a settlement request, in the storage unit, and transmits the information to the information processing device 100 as product information.

The manager terminal 60 is a terminal device used by a store manager. The manager terminal 60 receives alert notifications and the like from the information processing device 100.

The information processing device 100 is a device that notifies the manager terminal 60 with an alert, on the basis of the number of times of taking out operations of products placed in the basket 2a performed by the user 2 that is specified from the video data acquired by the camera 30, and the number of products purchased specified from the product information. In the following description, the number of times of taking out operations of products placed in the basket 2a performed by the user 2 is referred to as the "number of take-out operations".

For example, the user 2 performs an operation of taking out a product from the basket 2a, and scans the barcode on the product. Hence, if the number of take-out operations is different from the number of products purchased, it can be said that there are unpaid items. Therefore, the information processing device 100 can detect unpaid items, by notifying with an alert on the basis of the number of take-out operations and the number of products purchased.

Next, an example of a configuration of the information processing device 100 illustrated in FIG. 1 will be described. FIG. 2 is a functional block diagram illustrating a configuration of an information processing device according to the present embodiment. As illustrated in FIG. 2, the information processing device 100 includes a communication unit 110, an input unit 120, a display unit 130, a storage unit 140, and a control unit 150.

The communication unit 110 executes data communication between the camera 30, the self-checkout machine 50, the manager terminal 60, and the like. For example, the communication unit 110 receives video data from the camera 30. The communication unit 110 receives product information from the self-checkout machine 50.

The input unit 120 is an input device that inputs various types of information to the information processing device 100. The input unit 120 corresponds to a keyboard, mouse, touch panel, and the like.

The display unit 130 is a display device that displays information output from the control unit 150. The display unit 130 corresponds to a liquid crystal display, an organic Electro Luminescence (EL) display, a touch panel, and the like.

The storage unit 140 includes a video buffer 141, product information 142, model information 143, a data table 144, a determination table 145, and take-out operation number information 146. For example, the storage unit 140 is implemented by a semiconductor memory element such as a Random Access Memory (RAM) and a flash memory (Flash Memory), or a storage device such as a hard disk and an optical disc.

The video buffer 141 stores video data captured by the camera 30. The video data includes a plurality of image frames in chronological order.

The product information 142 is information acquired from the self-checkout machine 50, and includes information on a product from when the user 2 starts scanning to when the user 2 submits a settlement request. FIG. 3 is a diagram illustrating an example of a data structure of product information. As illustrated in FIG. 3, the product information 142 associates date and time information with product identification information.

The date and time information indicates the date and time when the self-checkout machine 50 scanned the barcode on the product. The product identification information is information for uniquely identifying a product. For example, the first lire of FIG. 3 indicates that the barcode on a product with the product identification information "item 101" was scanned on the date and time of "Sep. 10, 2021, at 10:13:30".

The model information 143 is a Neural Network (NN) that outputs information on the interaction between a user (human) and a product (object) when an image frame is input. For example, the model information 143 corresponds to Human Object Interaction Detection (HOID).

FIG. 4 is a diagram for explaining model information. As illustrated in FIG. 4, detection information 32 is output by inputting an image frame 31 in the model information 143. The detection information 32 includes user area information 32a, product area information 32b, and interaction information 32c.

The user area information 32a indicates a user area in the image frame 31 by coordinates (xy coordinates of the upper left and xy coordinates of the lower right). The product area information 32b, indicates an area of a product in the image frame 31 by coordinates (xy coordinates of the upper left and xy coordinates of the lower right). Moreover, the product area information 32b includes a class name unique to the product.

The interaction information 32c includes the probability of interaction between the user and the product detected from the image frame 31, and the class name of the interaction. A class name such as "Hold (the user is holding the product)" is set for the class name of the interaction.

The model information 143 according to the present embodiment outputs the detection information 32, only when there is interaction between the user and the product. For example, if an image frame of a user holding a product is input to the model information 143, the detection information 32 is output. On the other hand, if an image frame of a user not holding a product is input to the model information 143, the detection information 32 is not output.

The data table 144 is a data table used to track the product detected in each image frame. FIG. 5 is a diagram illustrating an example of a data structure of a data table. As illustrated in FIG. 5, the data table 144 includes a detection result table 144a, a tracking object table 144b, and a tracking-being-stopped object table 144c.

The detection result table 144a is a table that holds coordinates of a product area output from the model information 143. In the following description, the coordinates of the product area are referred to as "product area coordinates". The product area coordinates are indicated by [first element, second element, third element, and fourth element]. The first element indicates the x coordinate of the upper left in the product area. The second element indicates the y coordinate of the upper left in the product area. The third element indicates the x coordinate of the lower right in the product area. The fourth element indicates the y coordinate of the lower right in the product area.

The tracking object table 144b is a table that holds information on the product being tracked. The tracking object table 144b includes an identification (ID), product area coordinates, lost count, and stay count. The ID is an identification information assigned to the product area coordinates. The product area coordinates indicate the coordinates of the product area.

The lost count indicates the number of image frames counted when the product corresponding to the product area coordinates is no longer detected. The stay count indicates the number of image frames counted when the product corresponding to the product area coordinates is not moving.

The tracking-being-stopped object table 144c is a table that holds information on the product stopped being tracked. The tracking-being-stopped object table 144c includes an ID, product area coordinates, and a flag. The ID is identification information assigned to the product area coordinates. The product area coordinates indicate the coordinates of the product area.

The flag is information indicating whether to return the ID and the product area coordinates of the tracking-being-stopped object table 144c, to the tracking object table 144b. If the flag is set to "true", it indicates that the ID and the product area coordinates of the corresponding record are to be returned to the tracking object table 144b. If the flag is set to "false", it indicates that the ID and product area coordinates of the corresponding record are not to be returned to the tracking object table 144b.

Referring back to FIG. 5, the determination table 145 is a table used for counting the number of take-out operations. In the following description, an area of a temporary placing stand set beside the self-checkout machine 50 where the basket 2a is to be placed, is referred to as a "basket area". In the present embodiment, when the product area coordinates specified from the image frame move from the inside of the basket area to the outside of the basket area, one is added to the number of take-out operations. By using the determination table 145, the information processing device 100 can set the number of counts to be added to the number of take-out operations to one, even if the same product is taken out or put back into the basket area.

FIG. 6 is a diagram illustrating an example of a data structure of a determination table. As illustrated in FIG. 6, the determination table 145 associates an ID with a previous frame position and a counted flag. The ID is identification information assigned to the product area coordinates. The previous frame position is information used for identifying whether the product area coordinates detected from the previous image frame are inside or outside of the basket area.

In this example, if the product area coordinates of the corresponding ID that are the product area coordinates detected from the previous image frame are outside of the basket area, OUT is set to the previous frame position. If the product area coordinates detected from the previous image frame are inside of the basket area, "IN" is set to the previous frame position. The counted flag is a flag used for identifying whether a process of adding one to the number of take-out operations is performed on the corresponding ID.

In this embodiment, "false" is set as the initial value of the counted flag. While the position of the previous image frame of the product area coordinates of the corresponding ID is set to "IN", and when the product area coordinates of the corresponding ID detected from the position of the current image frame are "OUT", one is added to the number of take-out operations. In this case, the counted flag is updated from "false" to "true".

The take-out operation number information 146 includes information on the number of take-out operations.

Referring back to FIG. 2, the control unit 150 includes an acquisition unit 151, a tracking unit 152, a counting unit 153, and a determination unit 154. For example, the control unit 150 is implemented by a Central Processing Unit (CP) or a Micro Processing Unit (MPU). Moreover, for example, the control unit 150 may be executed by an integrated circuit such as an Application Specific Integrated Circuit (ASIC) or a Field Programmable Gate Array (FPGA).

The acquisition unit 151 acquires video data from the camera 30, and stores the acquired video data in the video buffer 141. The acquisition unit 151 acquires the product information 142 from the self-checkout machine 50, and stores the acquired product information 142 in the storage unit 140.

The tracking unit 152 tracks the product area coordinates based on the video data (image frames in chronological order) stored in the video buffer 141. For example, the tracking unit 152 repeatedly executes a process of specifying the product area coordinates by sequentially inputting the image frames to the model information 143, and updating the data table 144. Hereinafter, an example of a process of the tracking unit 152 will be described.

The tracking unit 152 inputs the image frame stored in the video buffer 141 to the model information 143, and acquires the product area coordinates included in the detection information. The tracking unit 152 registers the product area coordinates in the detection result table 144a. In the following description, the product area coordinates in the detection result table 144a are referred to as "first product area coordinates". The product area coordinates in the tracking object table 144b are referred to as "second product area coordinates". The product area coordinates in the tracking-being-stopped object table 144c are referred to as "third product area coordinates".

The tracking unit 152 calculates "similarity" on the basis of the distance between the centers of the product area coordinates to be compared. The similarity is increased with a decrease in the distance between the centers of the product area coordinates to be compared. It is assumed that the relation of the distance between the centers and the similarity is defined in advance.

The tracking unit 152 compares the first product area coordinates with each of the third product area coordinates in the tracking-being-stopped object table 144c, and determines whether there is a pair of the first product area coordinates and the third product area coordinates the similarity of which is equal to or greater than a threshold Th1. The value of the threshold Th1 is set in advance.

If there is a pair of the first product area coordinates and the third product area coordinates the similarity of which is equal to or greater than the threshold Th1, the tracking unit 152 executes the following process in the tracking-being-stopped object table 144c. The tracking unit 152 sets a flag of the entry with the third product area coordinates the similarity of which to the first product area coordinates is equal to or greater than the threshold Th1 to "true". Moreover, the tracking unit 152 deletes the entry with the first product area coordinates the similarity of which to the third product area coordinates is equal to or greater than the threshold Th1, from the detection result table 144a.

The tracking unit 152 compares the first product area coordinates with each of the second product area coordinates in the tracking object table 144b, and specifies the maximum similarity between the first product area coordinates and the second product area coordinates. If the maximum similarity is equal to or greater than a threshold Th3, the tracking unit 152 determines that the "corresponding product is not moving". If the maximum similarity is less than the threshold Th3 and equal to or greater than a threshold Th2, the tracking unit 152 determines that the "corresponding product is trackable". If the maximum similarity is less than the threshold Th2, the tracking unit 152 determines that the "corresponding product is not trackable". The values of the thresholds Th2 and Th3 are set in advance. However, it is assumed that the value of threshold Th3 is greater than the value of threshold Th2.

Figure 7:
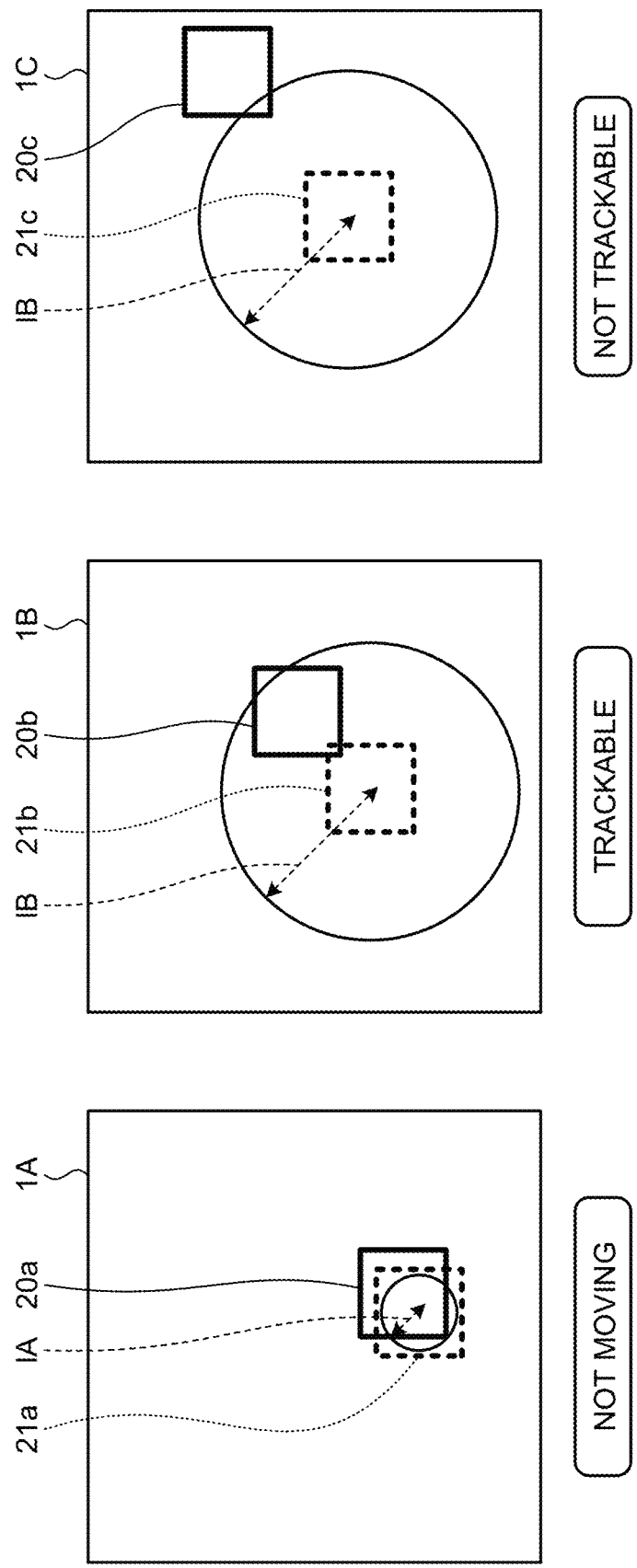
FIG. 7 is a diagram for explaining a process of a tracking unit.

FIG. 7 is a diagram for explaining a process of a tracking unit. In a case 1A in FIG. 7, a product area specified by the first product area coordinates is referred to as a product area 20a, and a product area specified by the second product area coordinates is referred to as a product area 21a. If the distance between the product area 20a and the product area 21a is less than a distance 1A (a case when the similarity based on the distance is equal to or greater than the threshold Th3), the tracking unit 152 determines that the "corresponding product is not moving".

If it is determined that the "corresponding product is not moving", the tracking unit 152 adds one to the stay count, for the entry corresponding to the product area 21a (second product area coordinates) in the tracking object table 144b.

In a case 1B in FIG. 7, a product area specified by the first product area coordinates is referred to as a product area 20b, and a product area specified by the second product area coordinate is referred to as a product area 21b. If the distance between the product area 20b and the product area 21b is equal to or greater than the distance 1A and less than a distance 1B (if the similarity based on the distance is less than the threshold Th3 and equal to or greater than the threshold Th2), the tracking unit 152 determines that the "corresponding product is trackable".

If it is determined that the "corresponding product is trackable", the tracking unit 152 updates the second product area coordinates to the first product area coordinates, for the entry corresponding to the product area 21b (second product area coordinates) in the tracking object table 144b. The tracking unit 152 sets the stay count to zero, for the entry corresponding to the product area 21b (second product area coordinates) in the tracking object table 144b.

In a case 1C in FIG. 7, a product area specified by the first product area coordinates is referred to as a product area 20c, and a product area specified by the second product area coordinates is referred to as a product area 21c. If the distance between the product area 20c and the product area 21c is equal to or greater than the distance IR (a case when the similarity based on the distance is less than the threshold Th2), the tracking unit 152 determines that the "corresponding product is not trackable".

If it is determined that the "corresponding product is not trackable", the tracking unit 152 registers a new entry of the first product area coordinates corresponding to the product area 20c, in the tracking object table 144b. To register a new entry, the tracking unit 152 allocates a new ID, and sets the stay count to zero and the lost count to zero.

In this process, among the entries in the tracking object table 144b, for the entry with the second product area coordinates the similarity of which to the first product area coordinates is not equal to or greater than the threshold Th2, the tracking unit 152 adds one to the lost count.

Among the entries in the tracking object table 144b, the tracking unit 152 extracts an entry in which the lost counter exceeds a threshold Th4. Among the extracted entries, for the entry in which the value of the stay counter is equal to or greater than a threshold Th5, the tracking unit 152 moves the corresponding entry (ID, second product area coordinates) to the tracking-being-stopped object table 144c, and sets the flag to "false".

Among the extracted entries, for the entry in which the value of the stay counter is less than the threshold Th5, the tracking unit 152 deletes the corresponding entry.

Among the entries in the tracking-being-stopped object table 144c, the tracking unit 152 moves an entry in which the flag is "true" to the tracking object table 144b, and sets the stay counter to zero.

Every time a new entry is registered in the detection result table 144a, the tracking unit 152 repeatedly executes the process described above, and updates the tracking object table 144b and the tracking-being-stopped object table 144c.

Referring back to FIG. 2, on the basis of the tracking object table 144b in the data table 144, the counting unit 153 counts the number of take-out operations that is the number of taking out operations of the products placed in the basket 2a performed by the user. The counting unit 153 registers the number of take-out operations in the storage unit 140, as the take-out operation number information 146. Hereinafter, an example of a process of the counting unit 153 will be described.

Figure 8:
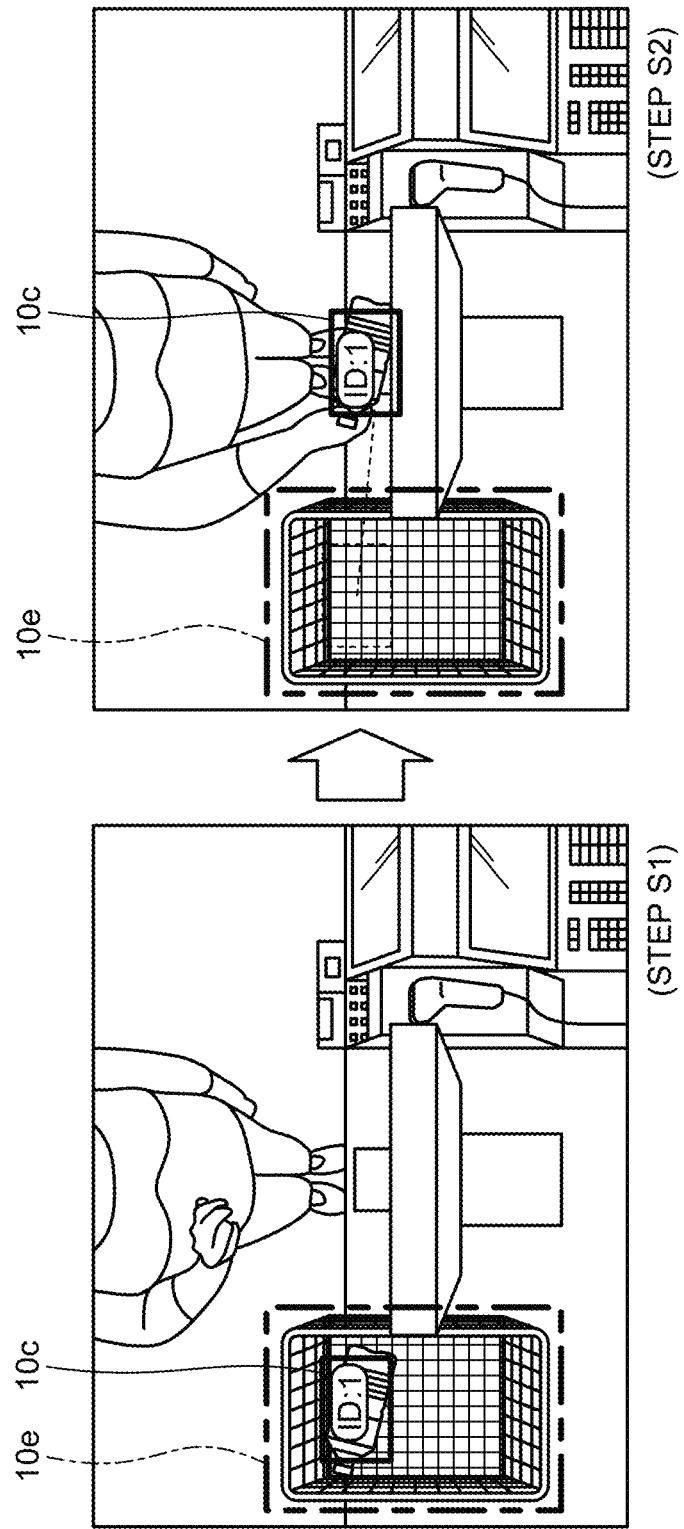
FIG. 8 is a diagram for explaining a process of a counting unit.

FIG. 8 is a diagram for explaining a process of a counting unit. Step S1 in FIG. 8 will be described. It is assumed that the counting unit 153 holds the coordinates of a basket area 10e in advance. The counting unit 153 refers to the tracking object table 144b, and when an entry with a new ID is added, adds an entry set with the same ID as that of the new ID to the determination table 145. To add an entry in the determination table 145, the counting unit 153 sets the counted flag to "false". In the following description, for convenience of explanation, an ID added to the determination table 145 will be referred to as an ID "1". It is assumed that an ID assigned to the second product area coordinates corresponding to the area 10c of the product is the ID "1".

The counting unit 153 compares the second product area coordinates of the entry with the ID "1" in the tracking object table 144b with the basket area 10e. If the second product area coordinates are not included in the basket area 10e, the counting unit 153 sets the previous frame position of the entry with the ID "1" to be added to the determination table 145 to "OUT". If the second product area coordinates are included in the basket area 10e, the counting unit 153 sets the previous frame position of the entry with the ID "1" to be added to the determination table 145 to "IN". In the example illustrated at step S1 in FIG. 8, the area 10c of the product corresponding to the second product area coordinates is included in the basket area 10e. Hence, the previous frame position of the entry with the ID "1" to be added to the determination table 145 is set to "IN".

The description proceeds to step S2 in FIG. 8. The counting unit 153 monitors the tracking object table 144b, and every time the tracking object table 144b is updated, the counting unit 153 compares the second product area coordinates corresponding co the ID "1" with the basket area 10e. When the second product area coordinates (area 10c of the product) corresponding to the ID "1" moves to an area not included in the basket area 10e, the counting unit 153 refers to the entry with the ID "1" in the determination table 145, and refers to the previous frame position and the counted flag.

For the entry with the ID "1" in the determination table 145, if the previous frame position is "IN" and the counted flag is "false", the counting unit 153 adds one to the number of take-out operations. Moreover, after adding, one to the number of take-out operations, the counting unit 153 updates the previous frame position to "OUT" and updates the counted flag to "true".

On the other hand, if the previous frame position "OUT" or if the counted flag is "true", the counting unit 153 skips the process of adding one to the number of take-out operations.

Every time an entry with a new ID is added to the tracking object table 144b, the counting unit 153 repeatedly executes the process described above. If the ID of the entry added to the tracking object table 144b is the same as the ID of the entry registered in the determination table 145, the counting unit 153 skips the process of registering the entry corresponding to the new ID in the determination table 145.

On the basis of the product information 142 and the take-out operation number information 146, the determination unit 154 notifies the manager terminal 60 with an alert. Hereinafter, an example of a process of the determination unit 154 will be described.

The determination unit 154 acquires the product information 142, and specifies the number of products purchased. For example, the determination unit 154 specifies the number of records with different date and time information in the product information 142, as the number of products purchased.

If the number of products purchased is different from the number of take-out operations in the take-out operation number information 146, the determination unit 154 sends an alert to the manager terminal 60. For example, if the number of products purchased is less than the number of take-out operations, there may be unpaid items. Hence, if the number of products purchased is less than the number of take-out operations, the determination unit 154 notifies the manager terminal 60 with an alert that an unpaid item is detected.

On the other hand, if the number of products purchased matches the number of take-out operations in the take-out operation number information 146, the determination unit 154 skips the process of notifying with an alert.

Figure 9:
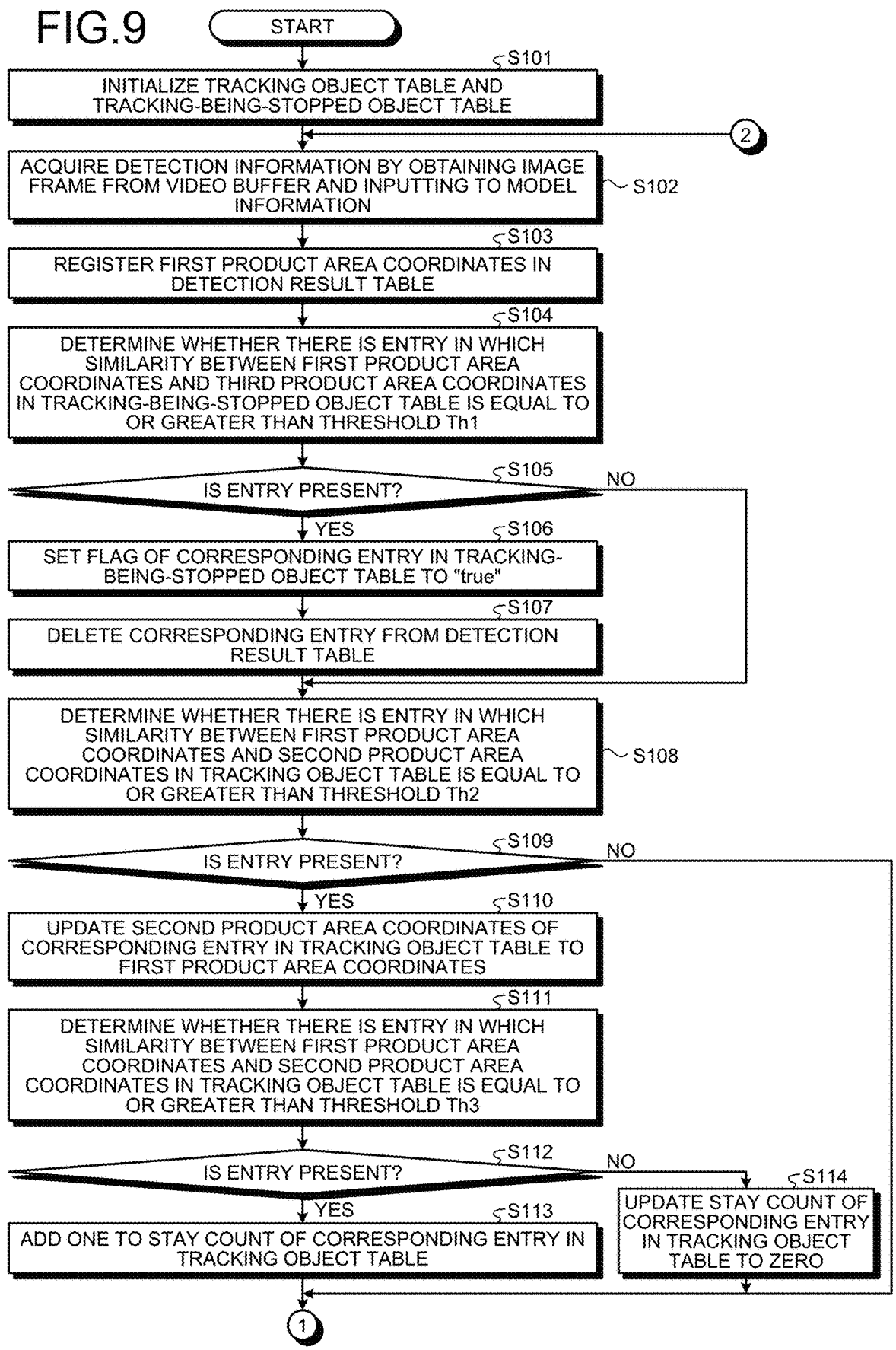
FIG. 9 is a flowchart (1) illustrating a processing procedure of a tracking process.
Figure 10:
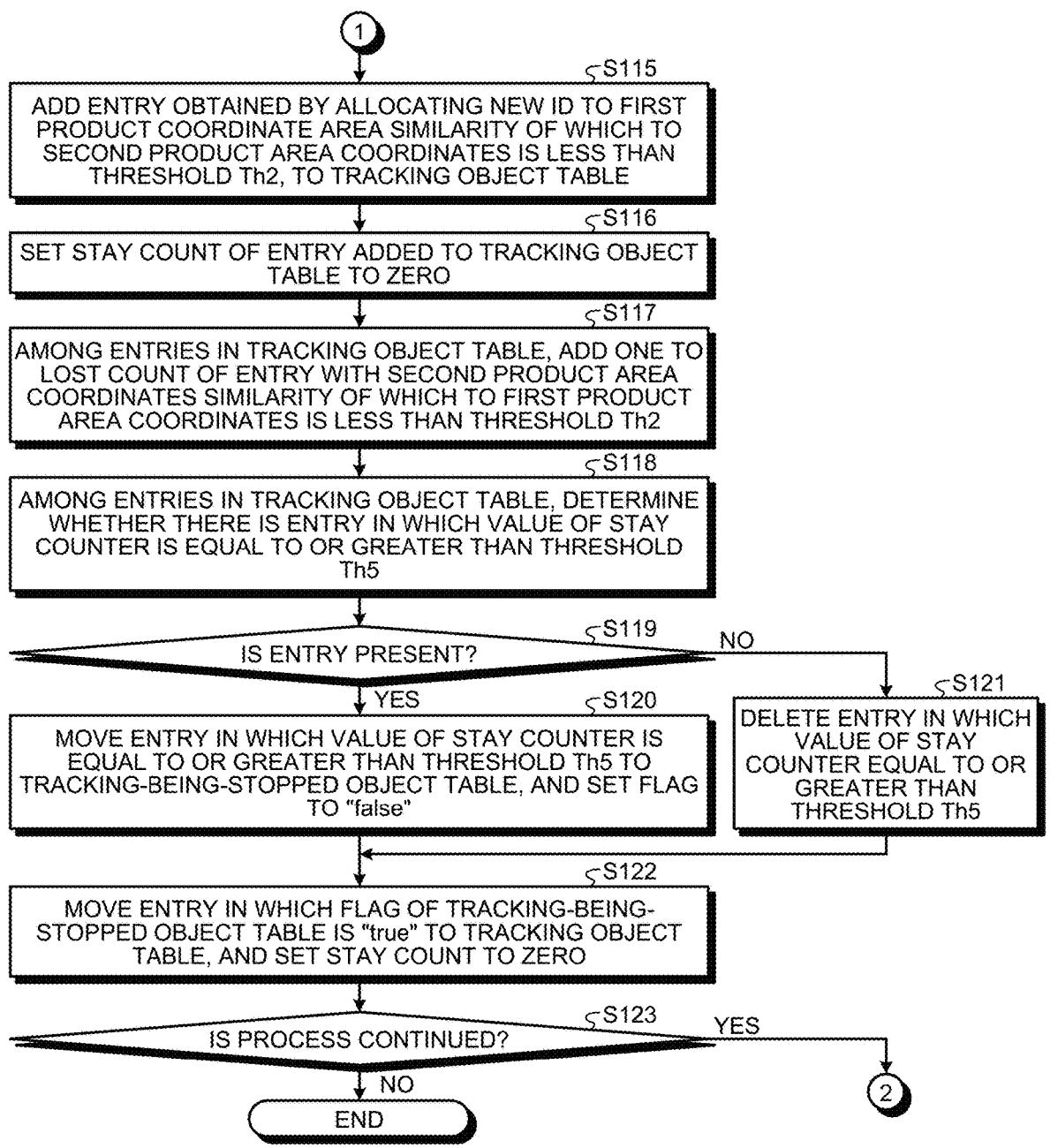
FIG. 10 is a flowchart (2) illustrating a processing procedure of the tracking process.

Next, an example of a tracking process performed by the tracking unit 152 of the information processing device 100 according to the present embodiment will be described. FIG. 9 and FIG. 10 are each a flowchart illustrating a processing procedure of the tracking process. As illustrated in FIG. 9, the tracking unit 152 of the information processing device 100 initializes the tracking object table 144b and the tracking-being-stopped object table 144c (step S101).

The tracking unit 152 acquires detection information, by obtaining an image frame from the video buffer 141, and inputting the obtained image frame to the model information 143 (step S102). The tracking unit 152 registers the first product area coordinates included in the detection information in the detection result table 144a (step S103).

The tracking unit 152 determines whether there is an entry in which the similarity between the product area coordinates and the third product area coordinates in the tracking-being-stopped object table 144c is equal to or greater than the threshold Th1 (step S104). If the entry is present (Yes at step S105), the tracking unit 152 proceeds to step S106. On the other hand, if the entry is not present (No at step S105), the tracking unit 152 proceeds to step S108.

The tracking unit 152 sets the flag of the corresponding entry in the tracking-being-stopped object table 144c to "true" (step S106). The tracking unit 152 deletes the corresponding entry from the detection result table 144a (step S107).

The tracking unit 152 determines whether there is an entry in which the similarity between the first product area coordinates and the second product area coordinates in the tracking object table 144b is equal to or greater than the threshold Th2 (step S108). If the entry is present (Yes at step S109), the tracking unit 152 proceeds to step S110. On the other hand, if the entry is not present (No at step S109), the tracking unit 152 proceeds to step S115 in FIG. 10.

The tracking unit 152 updates the second product area coordinates of the corresponding entry in the tracking object table 144b to the first product area coordinates (step S110). The tracking unit 152 determines whether there is an entry in which the similarity between the first product area coordinates and the second product area coordinates in the tracking object table 144b is equal to or greater than the threshold Th3 (step S111).

If the entry is present (Yes at step S112), the tracking unit 152 adds one to the stay count of the corresponding entry in the tracking object table 144b (step S113), and proceeds to step S115 in FIG. 10.

On the other hand, if the entry is not present (No at step S112), the tracking unit 152 updates the stay count of the corresponding entry in the tracking object table 144b to zero (step S114), and proceeds to step S115 in FIG. 10.

The description proceeds to FIG. 10. The tracking unit 152 adds an entry obtained by allocating a new ID to the first product area information the similarity of which to the second product area coordinates is less than the threshold Th2, to the tracking object table 144b (step S115). The tracking unit 152 sets the stay count of the entry added to the tracking object table 144b to zero (step S116).

Among the entries in the tracking object table 144b, the tracking unit 152 adds one to the lost count of the entry with the second product area coordinates the similarity of which to the first product area coordinates is less than the threshold Th2 (step S117).

Among the entries in the tracking object table 144b, the tracking unit 152 determines whether there is an entry in which the value of the stay counter is equal to or greater than the threshold Th5 (step S118). If the entry is present (Yes at step S119), the tracking unit 152 proceeds to step S120. On the other hand, if the entry is not present (No at step S119), the tracking unit 152 proceeds to step S121.

The tracking unit 152 moves the entry in which the value of the stay counter is equal to or greater than the threshold Th5, to the tracking-being-stopped object table 144c, and sets the flag to "false" (step S120). The tracking unit 152 moves the entry in which the flag of the tracking-being-stopped object table 144c is "true" to the tracking object table 144b, and sets the stay count to zero (step S122). The tracking unit 152 deletes the entry in which the value of the stay counter is equal to or greater than the threshold Th5 (step S121), and proceeds to step S122.

If the process is continued (Yes at step S123), the tracking unit 152 proceeds to step S102 FIG. 9. On the other hand, if the process is not continued (No at step S123), the tracking unit 152 terminates the process.

Figure 11:
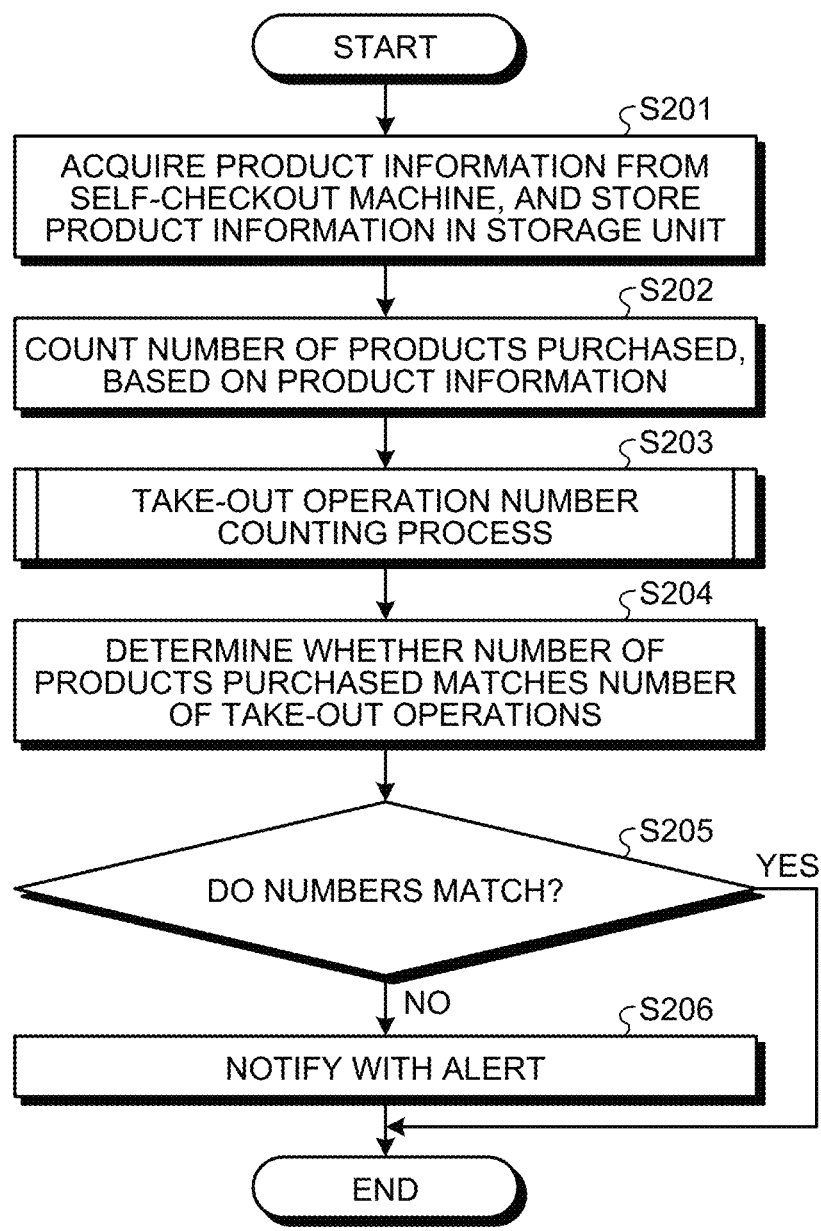
FIG. 11 is a flowchart illustrating a processing procedure of the information processing device according to the present embodiment.

Next, a processing procedure of the information processing device according to the present embodiment will be described. FIG. 11 is a flowchart illustrating a processing procedure of the information processing device according to the present embodiment. As illustrated in FIG. 11, the acquisition unit 151 of the information processing device 100 acquires the product information 142 from the self-checkout machine 50, and stores the acquired product information 142 the storage unit 140 (step S201).

The counting unit 153 of the information processing device 100 counts the number of products purchased, on the basis of the product information (step S202). The counting unit 153 executes a take-out operation number counting process (step S203).

The determination unit 154 of the information processing device 100 determines whether the number of products purchased matches the number of take-out operations (step S204). If the number of products purchased matches the number of take-out operations (Yes at step S205), the determination unit 154 terminates the process.

On the other hand, if the number of products purchased does not match the number of take-out operations (No at step S205), the determination unit 154 notifies the manager terminal 60 with an alert (step S206).

Figure 12:
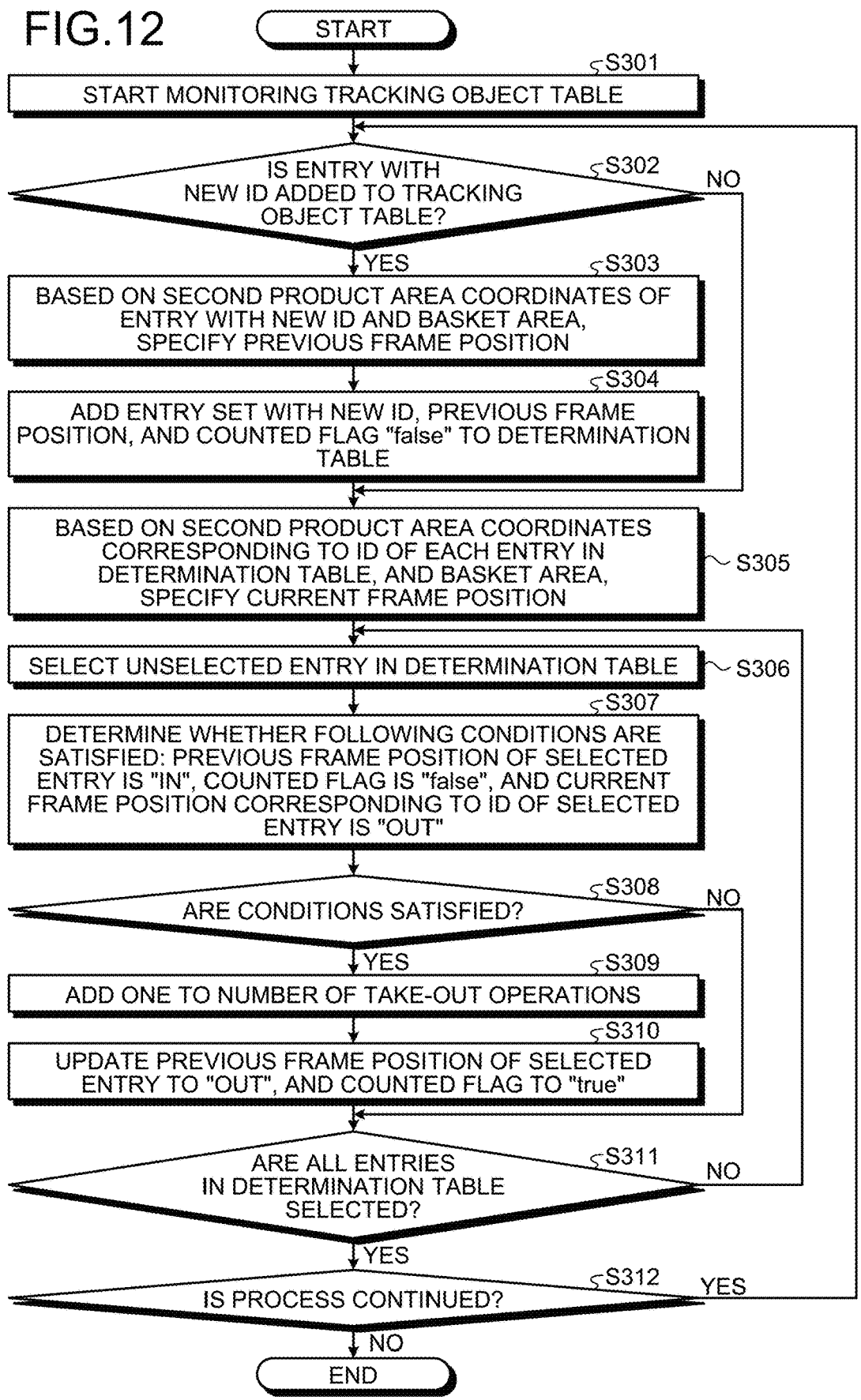
FIG. 12 is a flowchart illustrating a processing procedure of a take-out operation number counting process.

Next, an example of the processing procedure of the take-out operation number counting process described at step S203 in FIG. 11 will be described. FIG. 12 is a flowchart illustrating a processing procedure of the take-out operation number counting process. As illustrated in FIG. 12, the counting unit 153 of the information processing device 100 starts monitoring the tracking object table 144b (step S301).

If an entry with a new ID is added to the tracking object table 144b (Yes at step S302), the counting unit 153 proceeds to step S303. If an entry with a new ID is not added to the tracking object table 144b (No at step S302), the counting unit 153 proceeds to step S305.

On the basis of the second product area coordinates of the entry with a new ID and the basket area, the counting unit 153 specifies the previous frame position (step S303). The counting unit 153 adds an entry set with a new ID, the previous frame position, and the counted flag "false" to the determination table 145 (step S304).

On the basis of the second product area coordinates corresponding to the ID of each entry in the determination table 145, and the basket area, the counting unit 153 specifies the current frame position (step S305). The counting unit 153 selects an unselected entry in the determination table 145 (step S306).

The counting unit 153 determines whether conditions including the previous frame position of the selected entry is "IN", the counted flag is "false", and the current frame position corresponding to the selected entry that corresponds to the ID is "OUT", are satisfied (step S307).

If the conditions are satisfied (Yes at step S308), the counting unit 153 proceeds to step S309. If the conditions are not satisfied (No at step 3308), the counting unit 153 proceeds to step S311.

The counting unit 153 adds one to the number of take-out operations (step S309). The counting unit 153 updates the previous frame position of the selected entry to "OUT", and the counted flag to "true" (step S310).

If all the entries in the determination table 145 are not selected (No at step S311), the counting unit 153 proceeds to step S306. If all the entries in the determination table 145 are selected (Yes at step S311), the counting unit 153 proceeds to step S312.

If the process is continued (Yes at step S312), the counting unit 153 proceeds to step S302 if the process is not continued (No at step S312), the counting unit 153 terminates the take-out operation number counting process.

Next, effects of the information processing device 100 according to the present embodiment will be described. The information processing device 100 notifies with an alert, on the basis of the number of products purchased specified from the product information 142 acquired from the self-checkout machine 50 and the number of take-out operations counted by comparing the product area with the basket area. For example, if the number of take-out operations is different from the number of products purchased, it can be assumed that there are unpaid items. Hence, the information processing device 100 can detect unpaid items, by notifying with an alert on the basis of the number of take-out operations and the number of products purchased.

The processing content of the embodiment described above is merely an example, and the information processing device 100 may also perform other processes. In the following description, the other processes performed by the information processing device 100 will be described.

Another process (1) performed by the information processing device 100 will be described. The counting unit 153 of the information processing device 100 executes the process using the basket area set in advance. However, it is not limited thereto. The counting unit 153 may also count the number of take-out operations, by analyzing the image frame registered in the video buffer 141, specifying a first area corresponding to the basket area and a second area corresponding to the scan area, and using the specified first area.

Figure 13:
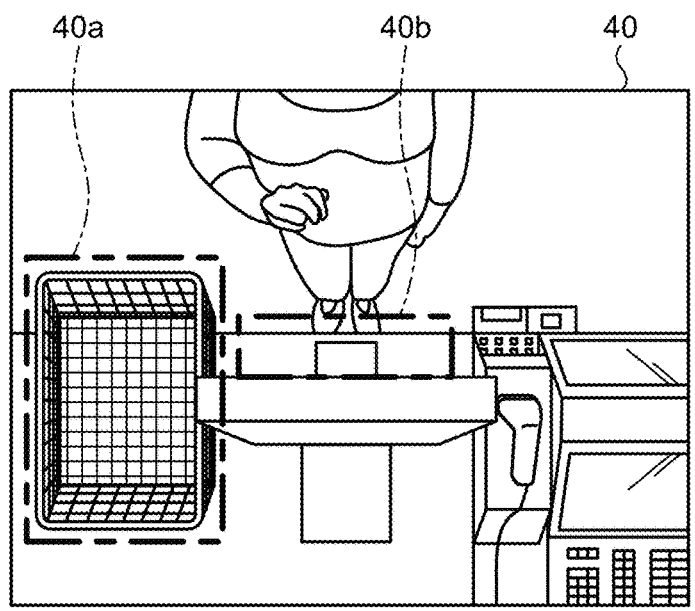
FIG. 13 is a diagram for explaining another process (1)

FIG. 13 is a diagram for explaining the other process (1). In the example illustrated in FIG. 13, a first area 40a and a second area 40b are specified from an image frame 40. The counting unit 153 may also specify the first area 40a and the second area 40b using a conventional technique such as pattern matching, or may specify the first area 40a and the second area 40b using a machine-trained model that is trained by machine. For example, such a machine-trained model is a model on which machine training is performed by inputting an image frame and using teacher data in which the coordinates of the first area and second area are correct data.

If the self-checkout machine 50 is moved or the position of the camera 30 is changed while the counting unit 153 is executing the process, the number of take-out operations is not accurately counted by executing the process using the basket area set in advance. In contrast, the basket area can be correctly specified and the number of take-out operations can be accurately counted, by analyzing the image frame registered in the video buffer 141, and specifying the second area corresponding to the basket area.

Another process (2) performed by the information processing device 100 will be described. The information processing device 100 described above counts the number of products purchased based on the product information 142 acquired from the self-checkout machine 50. However, it is not limited thereto. In the self-checkout machine 50, to ex cute the settlement process, the number of products purchased is displayed on the display screen. Therefore, the information processing device 100 may also specify the number of products purchased, by performing image analysis on the image frame on the display screen captured by the camera 30 (or other cameras).

Figure 14:
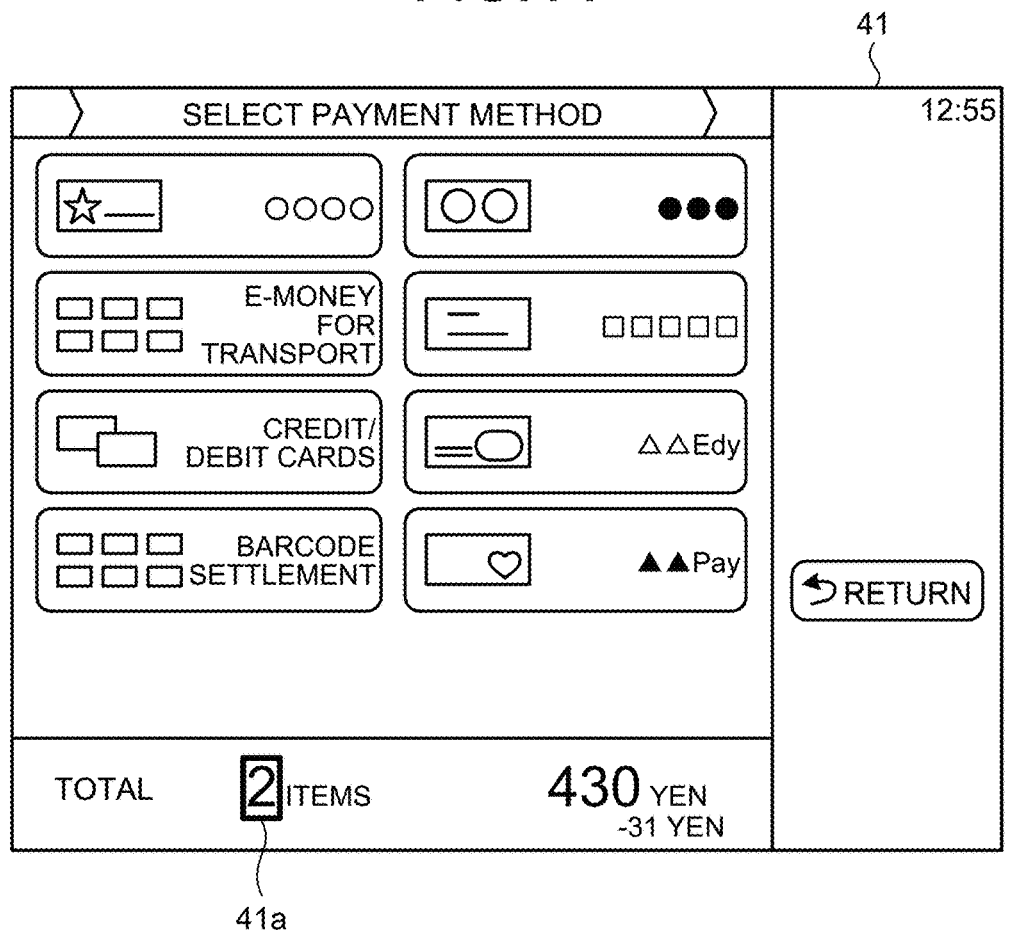
FIG. 14 is a diagram for explaining another process (2)

FIG. 14 is a diagram for explaining the other process (2). An image frame 41 in FIG. 14 corresponds to the display screen of the self-checkout machine 50. An area 41a includes the area 41a that indicates the number of products purchased. The counting unit 153 specifies the number of products purchased by analyzing the image of the area 41a.

As described above, the counting unit 153 analyzes the image frame on the display screen of the self-checkout machine 50 and specifies the number of products purchased. Hence, even if the information processing device 100 is not connected to the self-checkout machine 50, the information processing device 100 can notify with an alert by comparing the number of take-out operations and the number of products purchased. In the present embodiment, description has been made using barcodes. However, Quick Response (QR) codes and the like may also be used.

Figure 15:
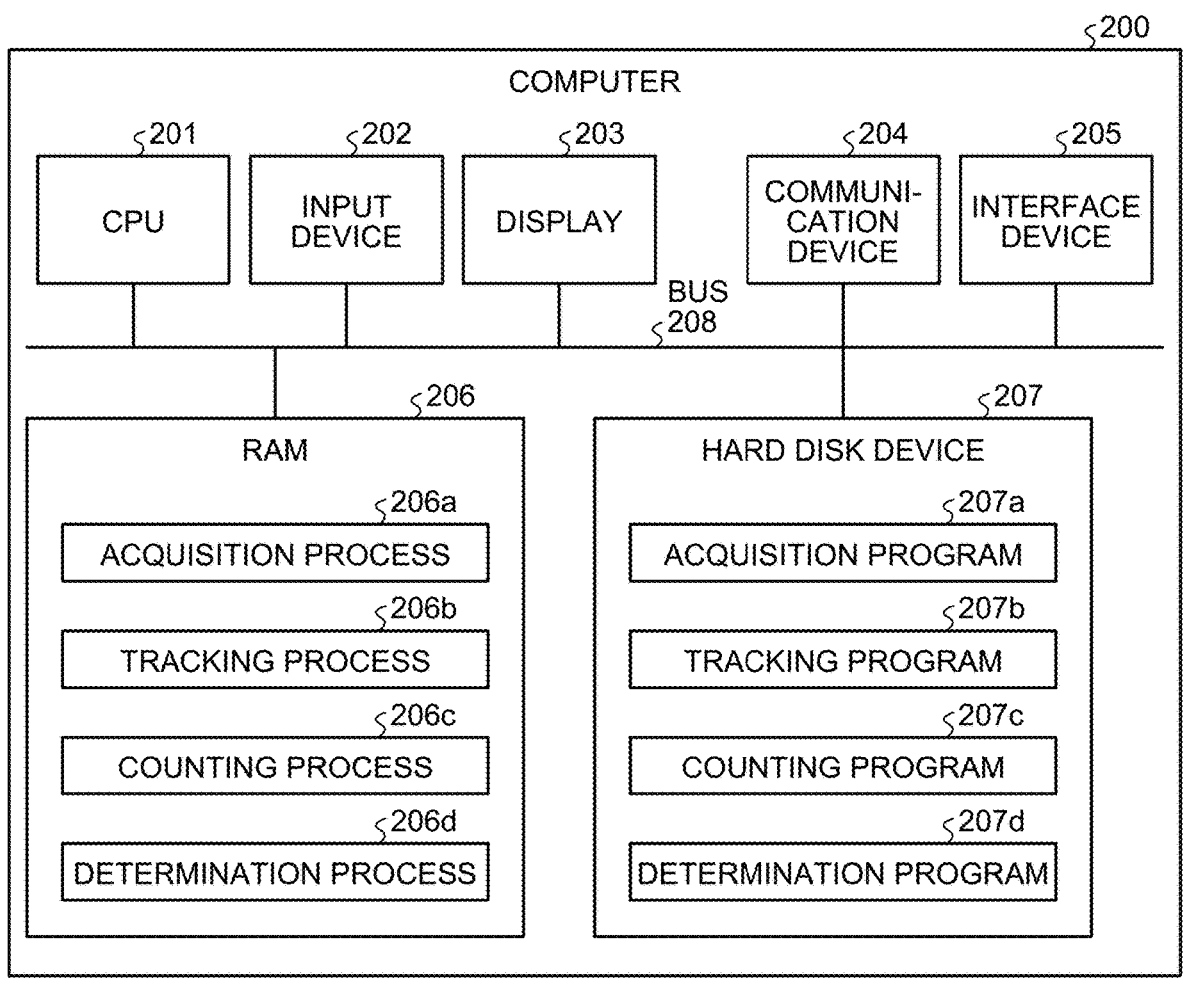
FIG. 15 is a diagram illustrating an example of a hardware configuration of a computer that implements the same functions as those of the information processing device of the embodiment.

Next, an example of a hardware configuration of a computer that implements the same functions as those of the information processing device 100 indicated in the embodiment described above will be described. FIG. 15 is a diagram illustrating an example of a hardware configuration of a computer that implements the same functions as those of the information processing device of the embodiment.

As illustrated in FIG. 15, a computer 200 includes a CPU 201 that performs various arithmetic processes, an input device 202 that receives data input from the user, and a display 203. Moreover, the computer 200 includes a communication device 204 that transmits and receives data to and from the camera 30, an external device, and the like, via a wired or wireless network, and an interface device 205. Furthermore, the computer 200 includes a RAM 206 for temporary storing various types of information and a hard disk device 207. Each of the devices 201 to 207 is then connected to a bus 208.

The hard disk device 207 includes an acquisition program 207a, a tracking program 207b, a counting program 207c, and a determination program 207d. Moreover, the CPU 201 reads each of the programs 207a to 207d, and develops the read program in the RAM 206.

The acquisition program 207a functions as an acquisition process 206a. The tracking program 207b functions as a tracking process 206b. The counting program 207c functions as a counting process 206c. The determination program 207d functions as a determination process 206d.

The process of the acquisition process 206a corresponds to the process of the acquisition unit 151. The process of the tracking process 206b corresponds to the process of the tracking unit 152. The process of the counting process 206c corresponds to the process of the counting unit 153. The process of the determination process 206d corresponds to the process of the determination unit 154.

The programs 207a to 207d need not be stored in the hard disk drive 207 from the beginning. For example, each program may be stored in a "portable physical medium" such as a flexible disk (FD), a compact disc read-only memory (CD-ROM), a digital versatile disc (DVD), a magneto-optical disc (MO), and an integrated circuit (IC) card that is to be inserted into the computer 200. The computer 200 may then read and execute each of the programs 207a to 207d.

Figure 16:
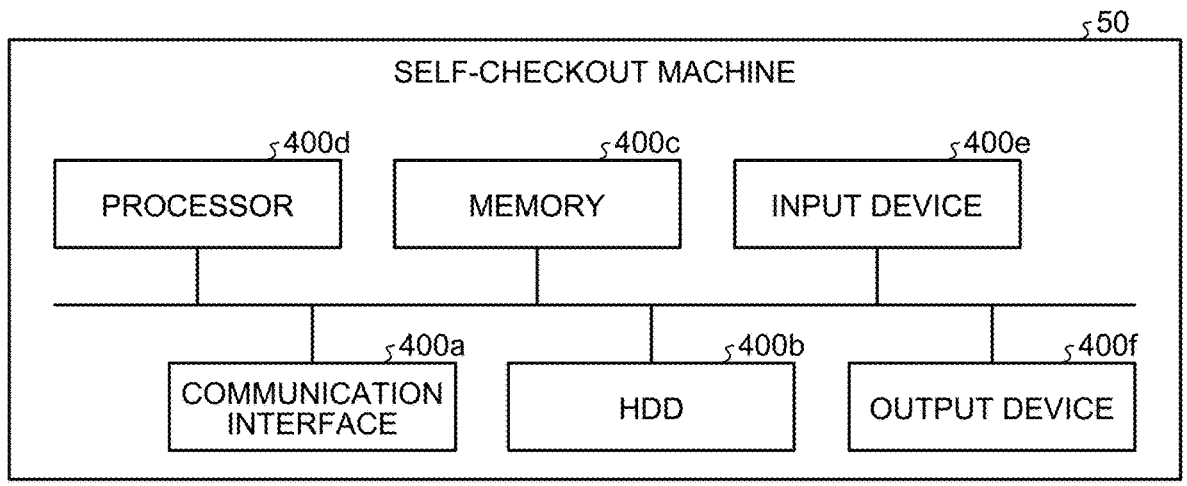
FIG. 16 is a diagram for explaining an example of a hardware configuration of a self-checkout machine.

FIG. 16 is a diagram for explaining an example of a hardware configuration of the self-checkout machine 50. As illustrated in FIG. 16, the self-checkout machine 50 includes a communication interface 400a, a hard disk drive (HDD) 400b, a memory 400c, a processor 400d, an input unit 400e, and an output unit 400f. The units illustrated in FIG. 16 are connected to each other via a bus and the like.

The communication interface 400a is a network interface card or the like and communicates with other information processing devices. The HDD 400b stores computer programs and data for operating the functions of the self-checkout machine 50.

The processor 400d is a hardware circuit that operates the process of executing the functions of the self-checkout machine 50, by reading a computer program that executes the process of the functions of the self-checkout machine 50 from the HDD 400b or the like, and developing the computer program on the memory 400c. In other words, the process performs the same function as That of each processing unit in the self-checkout machine 50.

Thus, the self-checkout machine 50 is operated as an information processing device that executes an operation control process by reading and executing a computer program that executes the process of the functions of the self-checkout machine 50. Moreover, the self-checkout machine 50 may also implement the functions of the self-checkout machine 50, by reading a computer program from a recording medium by a medium reading device, and executing the read computer program. The computer program in the other embodiments is not only executed by the self-checkout machine 50. For example, the present embodiment is similarly applicable, when another computer or server executes a computer program, or when the other computer and server execute a computer program in cooperation.

Moreover, the computer program that executes the process of the functions of the self-checkout machine 50 can be distributed via a network such as the Internet. Furthermore, the computer program can be executed by being recorded in a computer-readable recording medium such as a hard disk, FD, CD-ROM, MO, and DVD, and by being read out from the recording medium by a computer.

The input unit 400e detects various input operations by the user, such as an input operation of the computer program executed by the processor 400d. For example, the input operation includes a touch operation and the like. In the case of touch operation, the self-checkout machine 50 further includes a display unit. The input operation detected by the input unit 400e may be a touch operation on the display unit. For example, the input unit 400e may be a button, touch panel, proximity sensor, and the like. Moreover, the input unit 400e reads barcodes. For example, the input unit 400e is a barcode reader. The barcode reader includes a light source and an optical sensor, and scans barcodes.

The output unit 400f outputs data output from a computer program executed by the processor 400d via an external device connected to the self-checkout machine 50, such as an external display device and the like. If the self-checkout machine includes a display unit, the self-checkout machine 50 need not include the output unit 400f.

According to the embodiments, it is possible to detect unpaid items.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirt and scope of the invention.

What is claimed is:

1. A non-transitory computer-readable recording medium having stored therein a notification program that causes a computer to execute processing comprising:
   acquiring, from an accounting machine, product information generated when the accounting machine reads a code on a product;
   identifying a first feature amount related to first number of times indicating number of products purchased, based on the acquired product information;
   acquiring a plurality of sequential image frames in chronological order obtained by capturing an image of an object disposed in a certain area adjacent to the accounting machine and containing the product;
   generating, by inputting an image frame of the plurality of sequential image frames into a neural network, a first area information in which a first class indicating a user who purchased the product and a first area where the user appears are associated, a second area information in which a second class indicating an object including a product and a second area where the object appears are associated, and an interaction between the first class and the second class, wherein the first area information, the second area information and the interaction are within a same image frame;
   specifying product area coordinates of the product from the plurality of sequential image frames indicated by coordinates (xy coordinates of the upper left and xy coordinates of the lower right), the product area coordinates including first product area coordinates based on the first area information, the second area information, and the interaction generated, and second product area coordinates based on previous images;
   determining whether the first product area coordinates specified from the plurality of sequential image frames moves from inside of the certain area to outside of the certain area based on coordinates of the certain area and coordinates of the first product area by comparing distances between a center of the first product area coordinates and centers of the second product area coordinates, determining a maximum similarity based on the distances, and,
   in response to the maximum similarity exceeding a first threshold, determining that the product is not moving,
   in response to the maximum similarity being less than a second threshold, determining the object is not trackable and register a new product, and
   otherwise
      determining the object is trackable;
      specifying an action of the user of the taking out operations based on the first area information, the second area information, and the interaction;
   in response to the first product area coordinates specified from the image frames moving from inside of the certain area to outside of the certain area, determining taking out operations of a product has been placed in the object;
   identifying a second feature amount related to second number of times indicating number of times of taking out operations of a product placed in the object; and
   sending an alert for notifying that an unpaid item is detected based on the first feature amount and the second feature amount, wherein
   by inputting an image frame and using training data in which the coordinates of the first area where the object appears and the second area where the accounting machine reads the code on the product are correct data, the neural network is trained to identify the first area information in which the first class indicating the user who purchased the product and the area where the user appears are associated, the second area information in which the second class indicating the object including the product and the area where the object appears are associated, and the interaction between the first class and the second class.

2. The non-transitory computer-readable recording medium according to claim 1, wherein sending the alert is based on a difference between the first number of times and the second number of times.

3. The non-transitory computer-readable recording medium according to claim 1, wherein the acquiring the product information is to acquire the product information stored in a storage device of the accounting machine, when the accounting machine reads the code on the product.

4. The non-transitory computer-readable recording medium according to claim 1, wherein the acquiring the product information is to acquire the product information, based on image information displayed on a display screen of the accounting machine, when the accounting machine reads the code on the product.

5. A notification method executed by a computer, the method comprising:
   acquiring, from an accounting machine, product information generated when the accounting machine reads a code on a product;
   identifying a first feature amount related to first number of times indicating number of products purchased, based on the acquired product information;
   acquiring a plurality of sequential image frames in chronological order obtained by capturing an image of an object disposed in a certain area adjacent to the accounting machine and containing the product;
   generating, by inputting an image frame of the plurality of sequential image frames into a neural network, a first area information in which a first class indicating a user who purchased the product and a first area where the user appears are associated, a second area information in which a second class indicating an object including a product and a second area where the object appears are associated, and an interaction between the first class and the second class, wherein the first area information, the second area information and the interaction are within a same image frame;
   specifying product area coordinates of the product from the plurality of image frames indicated by coordinates (xy coordinates of the upper left and xy coordinates of the lower right), the product area coordinates including first product area coordinates based on the first area information, the second area information, and the interaction generated, and second product area coordinates based on previous images;

determining whether the first product area coordinates specified from the plurality of sequential image frames moves from inside of the certain area to outside of the certain area based on coordinates of the certain area and coordinates of the first product area by comparing distances between a center of the first product area coordinates and centers of the second product area coordinates, determining a maximum similarity based on the distances, and, in response to the maximum similarity exceeding a first threshold, determining that the product is not moving, in response to the maximum similarity being less than a second threshold, determining the object is not trackable and register a new product, and otherwise determining the object is trackable;

specifying an action of the user of the taking out operations based on the first area information, the second area information, and the interaction;

in response to the product area coordinates specified from the plurality of image frames moving from inside of the certain area to outside of the certain area, determining taking out operations of a product has been placed in the object;

identifying a second feature amount related to second number of times indicating number of times of taking out operations of a product placed in the object; and sending an alert for notifying that an unpaid item is detected based on the first feature amount and the second feature amount, wherein by inputting an image frame and using training data in which the coordinates of the first area where the object appears and the second area where the accounting machine reads the code on the product are correct data, the neural network is trained to identify the first area information in which the first class indicating the user who purchased the product and the area where the user appears are associated, the second area information in which the second class indicating the object including the product and the area where the object appears are associated, and the interaction between the first class and the second class.

6. The notification method according to claim 5, wherein sending is the alert based on a difference between the first number of times and the second number of times.

7. The notification method according to claim 5, wherein the acquiring the product information is to acquire the product information stored in a memory of the accounting machine when the accounting machine reads the code on the product.

8. The notification method according to claim 5, wherein the acquiring the product information is to acquire the product information, based on image information displayed on a display screen of the accounting machine, when the accounting machine reads the code on the product.

9. An information processing device, comprising:

a memory; and a processor coupled to the memory and configured to:

acquire, from an accounting machine, product information generated when the accounting machine reads a code on a product, identify a first feature amount related to first number of times indicating number of products purchased, based on the acquired product information, acquire a plurality of sequential image frames in chronological order obtained by capturing an image of an object disposed in a certain area adjacent to the accounting machine and containing the product;

generate, by inputting an image frame of the plurality of sequential image frames into a neural network, a first area information in which a first class indicating a user who purchased the product and a first area where the user appears are associated, a second area information in which a second class indicating an object including a product and a second area where the object appears are associated, and an interaction between the first class and the second class, wherein the first area information, the second area information and the interaction are within a same image frame;

specify product area coordinates of the product from the plurality of image frames indicated by coordinates (xy coordinates of the upper left and xy coordinates of the lower right), the product area coordinates including first product area coordinates based on the first area information, the second area information, and the interaction generated, and second product area coordinates based on previous images;

determine whether the first product area coordinates specified from the plurality of sequential image frames moves from inside of the certain area to outside of the certain area based on coordinates of the certain area and coordinates of the first product area by comparing distances between a center of the first product area coordinates and centers of the second product area coordinates, determining a maximum similarity based on the distances, and, in response to the maximum similarity exceeding a first threshold, determine that the product is not moving, in response to the maximum similarity being less than a second threshold, determine the object is not trackable and register a new product, and otherwise determine the object is trackable;

specify an action of the user of the taking out operations based on the first area information, the second area information, and the interaction;

in response to the first product area coordinates specified from the plurality of image frames moving from inside of the certain area to outside of the certain area, determine taking out operations of a product has been placed in the object;

identifying a second feature amount related to second number of times indicating number of times of taking out operations of a product placed in the object; and sending an alert for notifying that an unpaid item is detected based on the first feature amount and the second feature amount, wherein by inputting an image frame and using training data in which the coordinates of the first area where the object appears and the second area where the accounting machine reads the code on the product are correct data, the neural network is trained to identify the first area information in which the first class indicating the user who purchased the product and the area where the user appears are associated, the second area information in which the second class indicating the object including the product and the area where the object appears are associated, and the interaction between the first class and the second class.

10. The information processing device according to claim 9, further configured to send the alert based on a difference between the first number of times and the second number of times.

11. The information processing device according to claim 9, further configured to acquire the product information stored in a storage of the accounting machine when the accounting machine reads the code on the product.

12. The information processing device according to claim 9, further configured to acquire the product information, based on image information displayed on a display screen of the accounting machine, when the accounting machine reads the code on the product.

* * * * *